United States Patent

Goscenski, Jr.

[15] 3,707,111
[45] Dec. 26, 1972

[54] GEAR GENERATING FIXTURE FOR GEAR SHAPER

[72] Inventor: Edward J. Goscenski, Jr., Marshall, Mich.

[73] Assignee: The Bendix Corporation

[22] Filed: June 16, 1971

[21] Appl. No.: 153,716

[52] U.S. Cl. .......................................... 90/8, 90/10
[51] Int. Cl. ............................................. B23f 9/06
[58] Field of Search ................................. 90/1, 8, 10

[56] References Cited

UNITED STATES PATENTS 1,454,430   5/1923   Eberhardt ................................ 90/8
2,246,671   6/1941   Fischer ................................... 90/8

Primary Examiner—Francis S. Husar
Attorney—Ken C. Decker et al.

[57] ABSTRACT

A fixture for cutting gears mountable on a gear shaper comprising a housing formed with a longitudinal opening therein over which a gear cutting member slides in timed relationship to the shaper spindle on which the gear blank to be cut is carried for cutting engagement with said cutting member. The housing is secured to the gear shaper apron which is connected to the relieving mechanism to thereby obtain synchronization of movement between the reciprocating action of the spindle and the to-and-fro action of the housing on which the cutting member is carried. The cutting member is drivably connected to the gear shaper mandrel through the longitudinal opening by a cam and follower assembly. The cam and spindle are interconnected through the shaper gear box to establish a preselected ratio of rotation therebetween so that the cutting member slides linearly and tangentially in timed relationship to the rotation of the gear blank to be cut.

10 Claims, 8 Drawing Figures

PATENTED DEC 26 1972

3,707,111

INVENTOR.
EDWARD J. GOSCENSKI
BY
Ben C. Decker

INVENTOR.
EDWARD J. GOSCENSKI
BY Ken C. Decker

PATENTED DEC 26 1972

INVENTOR.
EDWARD J. GOSCENSKI
BY

GEAR GENERATING FIXTURE FOR GEAR SHAPER

BACKGROUND OF THE INVENTION

The invention concerns generally fixtures to be used with gear shapers which have been modified to facilitate the manufacture of a gear. The fixture of the present invention is designed for use of a 6-A type Fellows Gear Shaper, the detailed operation and description of which will be found in the Sixth Revised Edition published in 1962 by The Fellows Gear Shaper Co., Springfield, Vermont. This shaper requires modification to adapt it to the manufacture of a variable ratio pinion of the type used in rack and pinion steering systems for automotive vehicles. A steering gear of the rack and pinion type is shown in U. S. Pat. No. 3,064,491. The 6-A type Fellows Gear Shaper supports the gear blank or work piece to be cut on the apron of the shaper for movement toward and away from the cutting spindle each time the spindle goes up and down and simultaneously rotates the gear blank with respect to spindle rotation at some preselected ratio depending on the type of teeth being cut. This relationship of gear blank rotation and oscillation to cutter movement is incompatible with the type of gear cutter proposed by applicant for cutting a pinion. Applying the principles of applicants's invention to the modified gear shaper solves the problem heretofore present in the prior art.

SUMMARY OF THE INVENTION

In view of the foregoing, a principal object of the invention is to provide a gear generating fixture for a standard gear shaper with a minimum of changes thereto.

An important object of the invention is to provide a gear generating fixture to be used with a standard gear shaper without altering the basic components of the gear shaper.

Another object of the invention is to provide a gear generating fixture on which the cutting member slides linearly and tangentially to rotation of the gear blank to be cut which is carried on a reciprocating spindle.

A further object of the invention is to provide a novel and exceptionally versatile gear generating fixture for manufacturing gears on a standard gear shaper with a minimum of modifications.

A still further object of the invention is to provide an improved pinion generating fixture which utilizes a cutting member having teeth therein representative of the tooth configuration used on the rack with which the pinion is to be associated.

Still other objects and features of the present invention will become apparent to those skilled in the art from a consideration of the attached drawings illustrating one form of the invention.

DETAIL DESCRIPTION

Figure 1:
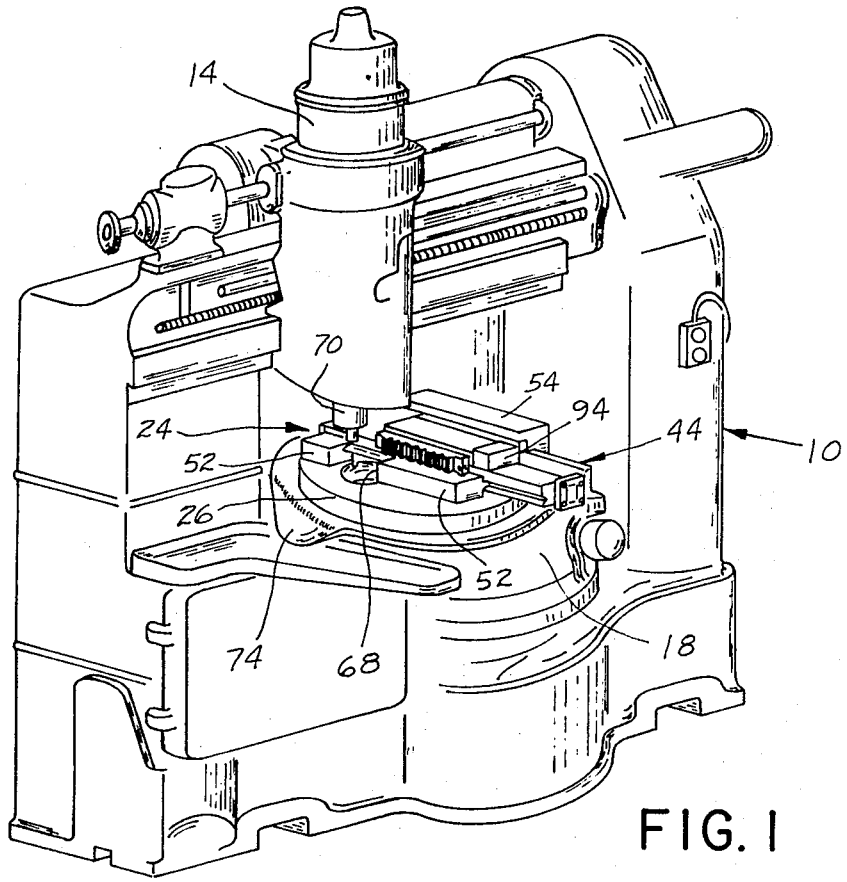
FIG. 1 is an outline drawing in isometric projection of the gear shaper machine on which the improvement is used.
Figure 7:
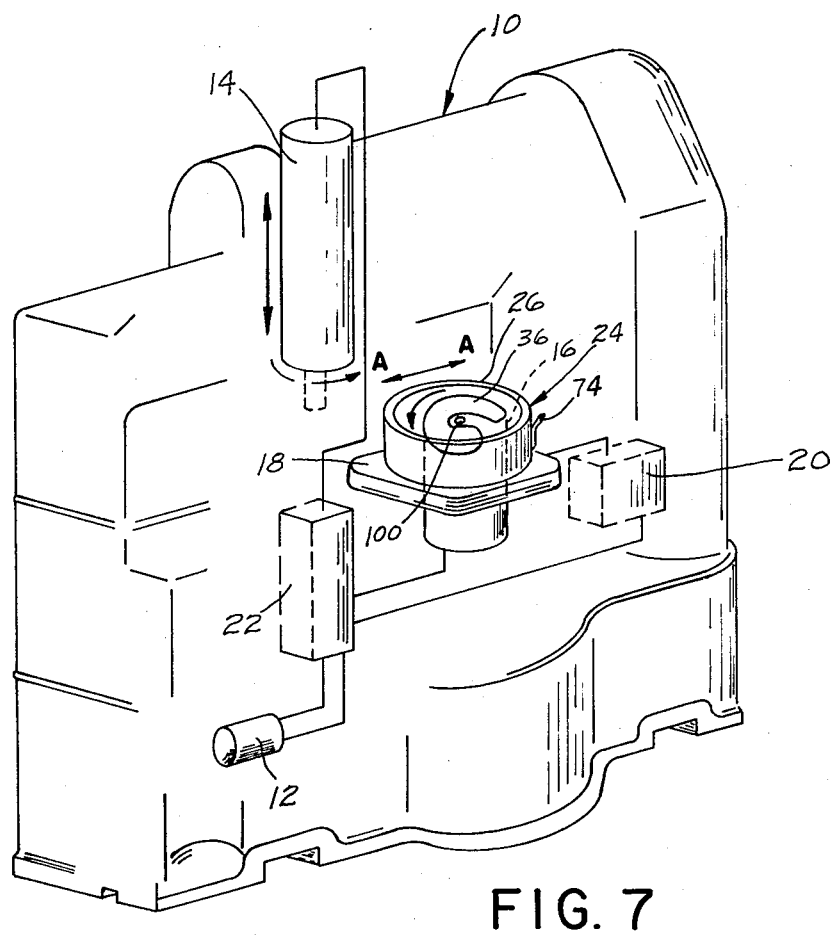
FIG. 7 is an outline drawing in isometric projection illustrating schematically the basic components of the gear shaper and their association with the improvement.
Figure 8:
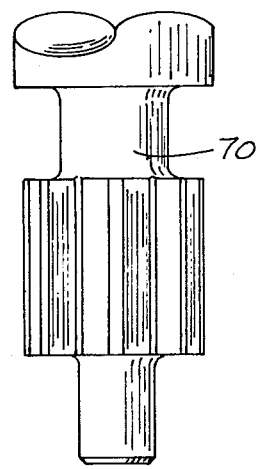
FIG. 8 is an isometric view of the gear manufactured in accordance with the principles of my invention.

As previously mentioned, the gear shaper 10, as best shown in FIGS. 1 and 7, is of standard design. It retains its basic components and operating principles, the details of which are fully explained in the aforementioned booklet. With reference to FIGS. 1 and 7, it will suffice to point out that the basic components of the machine include inter alia, a power section of electric motor 12, a first spindle 14, a second spindle or mandrel 16, an apron 18, a relieving mechanism 20 and a gear box and timing mechanism 22. The spindle 14, through the action of the timing mechanism and gear box 22 and relieving mechanism 20, rotates about its axis at a predetermined ratio with respect to rotation of the mandrel 16 and reciprocates in synchronization with respect to oscillation of the apron 18 normal to the axis of the spindle. The apron 18, under the influence of the relieving mechanism, moves toward and away from the spindle 14, as shown by the arrow A-A in FIG. 7. The spindle 14 and apron 18 are so synchronized that on the down stroke of the spindle the apron is at its extreme left position and on the up stroke of the spindle the apron is moved to its extreme right position. This provides for engagement or cutting action between the work piece and cutter on the down stroke and clearance or relief between the work piece and cutter on the up stroke of the spindle. The operative relationship and function of these components with respect to the improvement will become apparent as the description proceeds.

Figure 2:
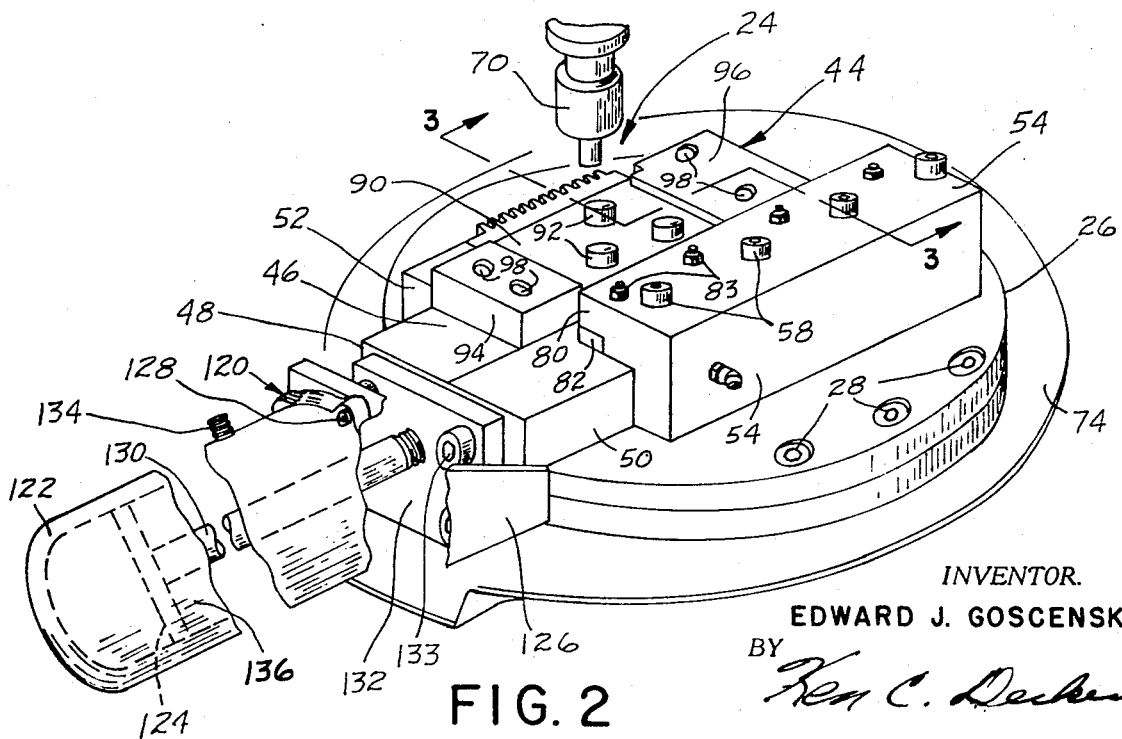
FIG. 2 is an enlarged outline drawing of the improved gear generating fixture of FIG. 1, as viewed from a different angle.
Figure 3:
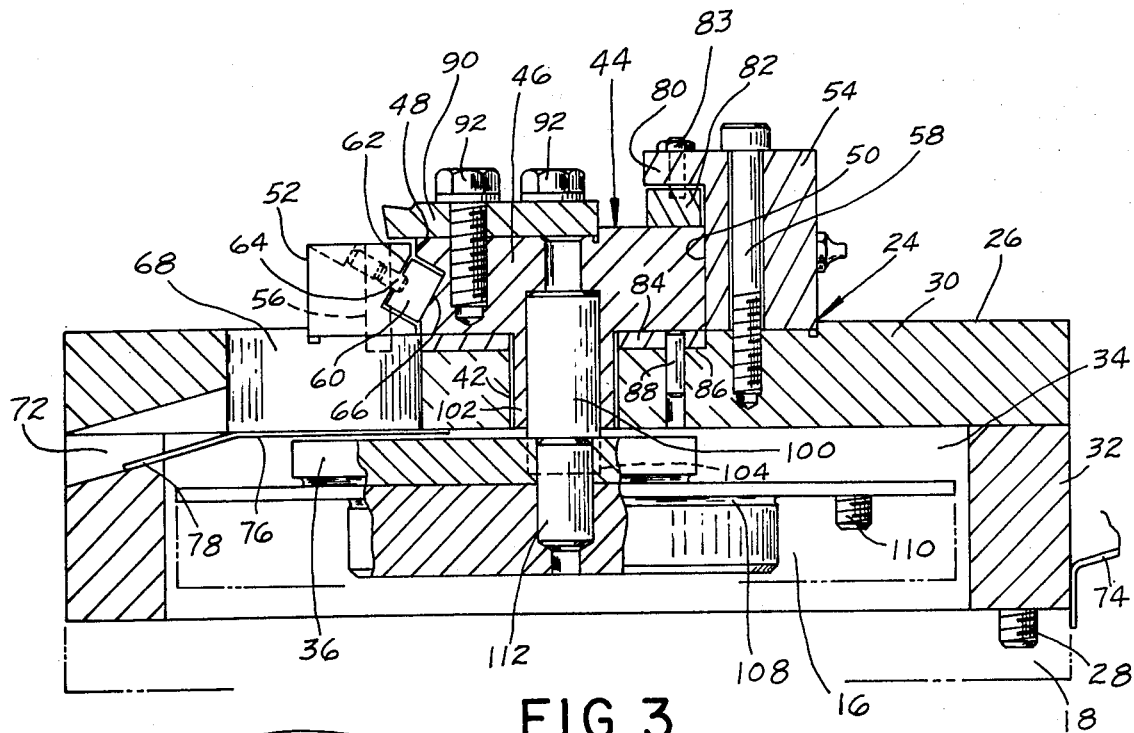
FIG. 3 is a view in section taken on the line 3—3 of FIG. 2.
Figure 5:
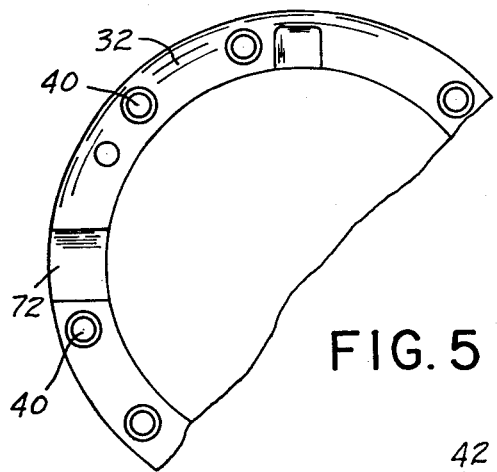
FIGS. 5 and 6 are fragmentary portions of the fixture housing.

The improvement resides in utilizing the basic components of the gear shaper 10 in association with a gear generating fixture 24 which includes a housing 26 removably attached to the apron 18 by studs 28, as best shown in FIGS. 2 and 3. The housing 26 includes a top portion or plate 30 and a side wall portion 32 forming a cavity 34 into which the second spindle or mandrel 16 extends for driving engagement with a cam 36. The top portion 30 and wall portion 32 are formed with mating bores 38 and 40, respectively, through which the studs 28 pass to secure the housing to the apron as aforesaid. The top portion 30 of the housing is provided with an elongated opening 42 over which a cutting device 44 is slidably positioned in operative relationship to the cam 36 and the mandrel 16. The device includes a cutting member 46 having parallel sides 48 and 50 which are in sliding contact with parallel guide members or rails 52 and 54, respectively, secured to the top portion 30 of the housing by bolts 56 and 58. A bearing member 60, in the form of a rectangular bar, is carried in a groove 62 of the rail 52 by screws 64. The bar or bearing member 60 rides in a groove 66 of the cutting member 46, see FIG. 3. There are two such guide members or rails 52, one located each side of opening 68 which is formed in the top portion 30 of the housing 26. The opening 68 provides for the disposition of the chips removed from gear blank 70 by the cutting action of the member 46. The chips fall into the opening 68 from which they are carried by gravity through a channel 72, formed at the junction of the underside of the top portion 30 with the upper side of the wall 32, to an oil pan 74 secured to the housing 26. The opening 68 is closed at its inner end by a cover 76 having a sloping portion 78 which rests on the wall 32, thus preventing the chips from falling into the cavity 34. The rail 54 includes an overhanging portion 80 from which a rectangularly shaped bearing bar 82 is adjustably supported by studs 83 on the cutting member 46. The underside of the cutting member 46 is in contact with and slides on a well lubricated sheet of bearing material 84 located in a groove 86 of the plate 30. Pins 88, only one of which is shown, retain the sheet 84 in the groove 86. The cutting member 46 includes a blade portion 90 securely fastened thereto by bolts 92. Anchoring blocks 94 and 96 are mounted to the cutting member 46 adjacent the ends of the blade by studs 98 to insure against distortion or misalignment of the blade 90 which is subjected to high stresses during cutting engagement with the gear blank 70. The work piece or gear blank 70 is supported in the spindle 14 by suitable means such as a chuck.

Figure 4:
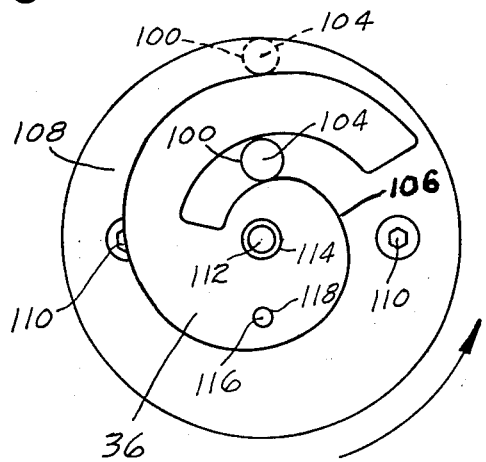
FIG. 4 is a top plan view looking down on the cam and apron assembly before mounting the fixture housing on the apron of the machine.
Figure 6:
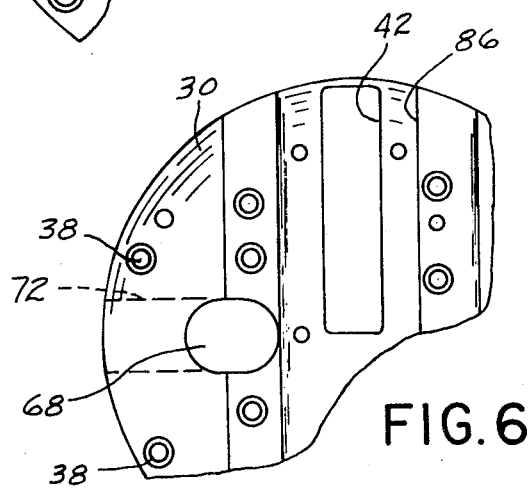

The cutting member 46 is operatively connected to the second spindle or mandrel 16 through a cam and follower assembly comprising the cam 36 and follower 100. The follower is pressed into a boss 102 formed on the underside of the cutting member 46. A portion 104 of the follower projects beyond the boss 102 into the cam track 106 for driving engagement with the cam surface. A spindle or mandrel adapter 108 is secured to the mandrel 16 by screws 110. A centering pin 112 has one end fitted into the mandrel adapter 108 to establish the axis of rotation of the cam 36 which is the same as the axis of rotation of the mandrel 16. The cam 36 is provided with a hole 114 into which the pin 112 passes to establish the center of rotation of the cam. A plurality of pins 116 (only one of which is shown), having one end located in the mandrel adapter 108 and its other end extending into opening 118 of the cam, holds the cam securely to the mandrel adapter to rotate therewith, as best shown in FIG. 4. The follower 100 is held in operative engagement with the cam face 106 by an air cylinder assembly 120 having a shell or housing 122 and a piston 124 slidably positioned in the shell. The shell 122 is secured to housing bracket 126 by bolts 128. A shaft 130, to one end of which the piston 124 is attached, has its other end threadedly connected to end plate 132 which is fastened to the cutting member 46 by studs 133. An air valve 134 permits filling the chamber 136 with air to some predetermined pressure compatible with other design requirements of the fixture. The air pressure within the chamber 136 acts on the piston 124 urging it, together with the cutting member 46, downwardly as viewed in FIG. 2, thus holding the portion 104 of the follower 100 in driving relationship to the cam surface of the track 106. As best seen in FIG. 4, it will be observed that when the cutting member 46 is fully retracted in preparation for cutting a gear the follower 104 will be in the position with respect to the cam 36 as represented by the full line. After completing a gear cutting cycle, the cutting member 46 has moved to its fully extended position and the position of the follower 104 with respect to the cam will be as represented by the dotted line.

MODE OF OPERATION

The fixture assembly 24 is connected to the mandrel 16 and apron 18 and the pinion 70 is securely supported in the spindle 14. With the fixture in place, the working parts, such, for example, as cam 36 and follower 100, cutting member 46 and blade 90, and air cylinder 120, are all checked out with regard to the fit of the part, i.e., whether too tight or too loose, depending on design requirements, to make sure that the moving parts of the fixture operate freely.

The shaper is now manipulated by hand or even power operated in establishing the proper relationship between the blade 90 of the cutting member 46 and the work piece or pinion 70. This relationship is determined in part by the depth of the cut desired which, in turn, depends upon the material of the work piece. As described above, the apron 18, on which the cutting member is carried, is synchronized through the relieving mechanism 20 with the up and down movement of the spindle 14 so that when the spindle moves down with the work piece thereon the cutting member is moved into the path of travel of the work piece, and when the spindle moves up, the cutting member is moved away from the path of travel of the work piece. Accordingly, the shaper is cycled so that the cutting member is moved into the path of the work piece when the adjustment is made for cutting depth on the work piece. Now with the cutting member 90 so positioned, the spindle 14, on which the work piece is supported, is traversed toward the cutter by manipulating the machine in a manner well known to those skilled in the art until the cut to be made is of the depth required.

In addition to synchronizing the reciprocating action of the work piece supported on the spindle with the to-and-fro action of the cutting member, the rotation of the work piece on the spindle is fixed or timed to rotation of the mandrel driven cam which drives the cutting member 90 tangentially to the rotation of the work piece 70. Upon cycling the machine, with the cutting member in its fully retracted position, the cutting member 90 traverses past the work 70 as the work piece rotates. The rate of traverse of the cutting member, of course, is determined by the cam design and this rate will vary with tooth size for a given cutter. Rotation of the cam 360° will have caused the cutting member 46 to have traversed from its fully retracted position to its fully extended position, thus completing a full machine cycle. With reference to FIG. 4, it will be seen that the follower 100 has traveled from the full line position to the dotted line position during this cycle. At the end of the cycle the machine may be stopped, or shifted by hand or automatically to start a new cutting cycle if necessary. This function is a part of the machine and is well known to those skilled in the art.

While there have been described above the principles of this invention in connection with specific apparatus, it is to be clearly understood that this description is made only be way of example and not as a limitation to the scope of the invention.

I claim:

1. In a gear cutting machine of the type having a spindle which reciprocates while it rotates and an apron connected to a relieving mechanism adapted to oscillate said apron in a plane normal to the axis of said spindle and being further provided with a mandrel operatively connected to said spindle and to said mechanism such that the spindle and the mandrel rotate with respect to each other at a predetermined ratio and the spindle and apron are synchronized with respect to their relative positions as they reciprocate and oscillate respectively, the improvement which comprises:

means for supporting the gear to be cut on the spindle for rotation and reciprocation about its axis;
a fixture mounted to the apron for synchronized movement with respect to reciprocation of the spindle; and
a cutting device including a cutting member positioned on the fixture for cutting engagement with the gear and operatively connected to the mandrel to thereby cause the cutting member to traverse the gear in timed relationship thereto.

2. The improvement in claim 1 wherein said fixture includes a housing removably attached to the apron and embracing the mandrel which is operatively connected to the cutting member.

3. The improvement in claim 2 wherein said housing further comprises a top portion having an opening therein through which said cutter member is connected to said mandrel for sliding motion in said top portion tangentially to the rotation of the gear carried on the spindle.

4. The improvement in claim 3 wherein said cutting member is formed with parallel sides and said top portion of the housing is provided with parallel bearing rails slidingly engaging the respective sides.

5. The improvement in claim 4 having a cam follower carried by said cutting member; and a cam mounted for rotation with said mandrel and provided with a cam surface on which said follower rides.

6. The improvement in claim 5 wherein an air cylinder assembly having a shell and piston slidable therein has its shell carried on the housing and its position connected to said cutting member to thereby cause the cam follower to maintain contact relationship with the cam surface.

7. A method of manufacturing a pinion for use with a rack of variable ratio comprising:

rotating and reciprocating the pinion with respect to its axis;
traversing a cutter having teeth formed thereon representative of the rack along a path tangentially to rotation of said pinion at a predetermined rate; and
oscillating the cutter in a plane normal to the axis of rotation and reciprocation of the pinion so that the cutter is in the path of travel of the pinion on its down stroke and outside the path of travel of said pinion on its up stroke.

8. A method of manufacturing a pinion, as recited in claim 7, further comprising:

synchronization of the reciprocating motion of the pinion with respect to the oscillating motion of the cutter.

9. A method of manufacturing a pinion as recited in claim 8, wherein the cutter is traversed at a varying rate.

10. In combination with a gear shaper of the type having a spindle which reciprocates in timed relationship to an apron which moves toward said spindle on its down stroke and away from said spindle on its up stroke, and a rotating mandrel geared to the spindle to establish a predetermined ratio of rotation therebetween, the improvement which comprises:

means securing a pinion gear to the spindle so that said pinion rotates and reciprocates about the axis of said spindle which is also the axis of the pinion;
a pinion generating fixture carried on the apron for movement therewith toward and away from said spindle;
a cutting member slidably mounted to the fixture and drivably connected to the mandrel for traversing the pinion in cutting engagement on its down stroke at a predetermined rate and moving out of engagement with the pinion on its up stroke;
said cutting member is drivably connected to the mandrel by a cam mounted to rotate with the mandrel and a follower carried by the cutting member; and
means urging the follower into driving relationship with the cam.

* * * * *